INVENTOR.
MASANORI OHTA

United States Patent Office 3,455,792
Patented July 15, 1969

3,455,792
REMOVAL OF LIQUID PARTICLES DURING DISTILLATION FROM GASES WITH POROUS POLYTETRAFLUOROETHYLENE PAPER
Masanori Ohta, Kyoto, Japan, assignor to Daikin Kogyo Co., Ltd., Osaka, Japan, a corporation of Japan
Filed May 10, 1967, Ser. No. 637,452
Claims priority, application Japan, May 12, 1966, 41/30,319
Int. Cl. C02b 1/06; B01d 39/16
U.S. Cl. 203—40          2 Claims

ABSTRACT OF THE DISCLOSURE

Method for removing the fine liquid particles dispersed in a gaseous body which comprises passing a gaseous body containing fine particulate liquid as dispersed therein through at least one layer of continuous, porous sheet-formed substance made of polytetrafluoroethylene.

---

Figure 1:
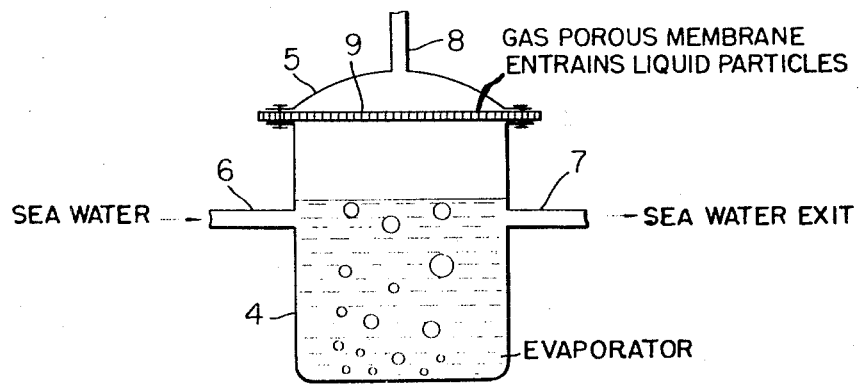

This invention relates to a method for removing fine liquid particles dispersed in gaseous bodies.

Generally removal of liquid drops dispersed and floating in a gaseous body in the form of fine particles without affecting the properties of the said gas is an important problem for the industry. For example, in sea water distillation to convert the same to pure water, the fine spatterings of the saline water formed with boiling of the sea water are entrained into the condenser with steam, and because the spatterings contain salt at the same concentration as of the starting sea water, thus obtained distilled water comes to contain a considerable amount of salt and in most cases is unsuitable for drinking.

Conventionally employed means to prevent such to produce pure water of little salt content includes provision of a catch-all between the evaporator and condenser. As the catch-all there is, for example, that of column type, in which the fine liquid particles are removed as they are contacted with the walls of the column with the passage of the steam through the empty column. However attempts to completely remove the spatterings and to let pass the entirety of the steam alone by means of any type of catch-all including the above type encounter serious technical difficulties.

Accordingly, therefore, the object of the invention is to provide a method for completely removing the fine liquid particles dispersed in gaseous bodies with ease. Other objects of the invention will become apparent from the following descriptions.

This and other objects of the invention can be accomplished by the use of a continuous, porous sheet-formed matter of polytetrafluoroethylene as the filter layer, and by letting the gaseous body containing the fine liquid particles pass through that layer.

Needless to explain, polytetrafluoroethylene having very low affinity with almost all types of substances compared with other synthetic resins, it never obsorbs vapor of such substances. The same also has a property to repel liquid. I found that the continuous, porous sheet-formed matter made of polytetrafluoroethylene allows perfect passage of gaseous body but repels liquid particles such as of saline water and would not let such permeate therethrough, and arrived at the subject invention. According to the invention particularly the drawbacks in the conventional techniques of sea water purification are all removed, and furthermore the equipment sizes can be much lessened to realize low cost operation.

As the continuous, porous sheet-formed matter made of polytetrafluoroethylene of the invention, paper, air-pervious cardboard or board-like structure prepared by the steps of forming a web from fibrous powder of polytetrafluoroethylene, drying the same and sintering the same at a temperature not lower than 327° C. are intended. Inter alia, the sheet-formed matter from the process described in Yutaka Kometani et al. U.S. Ser. No. 403,367, viz., the product of the process comprising dispersing fibrous powder of polytetrafluoroethylene having an average fiber length of 100–5,000μ and the ratio of the length to the average diameter (normally called "shape factor") of not less than 10, in a liquid having a surface tension at 25° C. of not greater than 40 dynes/cm., forming a web from the dispersion, drying the same and sintering the same at a temperature not lower than 327° C. is advantageously used. Furthermore, among the continuous, porous sheet-formed matters obtained by the above process normally having an average pore diameter of 0.5–50μ and a porosity of 5–80%, those having the average pore diameter of 2–50μ and a porosity of 50–80% are particularly suited for the separation of fine liquid particles from the gaseous body in which the particles are dispersed, in accordance with the invention. Those having an average pore diameter of less than 5μ, particularly 2μ, and a porosity of below 50% are useful for removal of fine liquid particles, but shows strong resistance to passage of vapor and for this reason are objectionable for ordinary purposes.

Now the invention will be explained with reference to the attached drawings.

Figure 2:
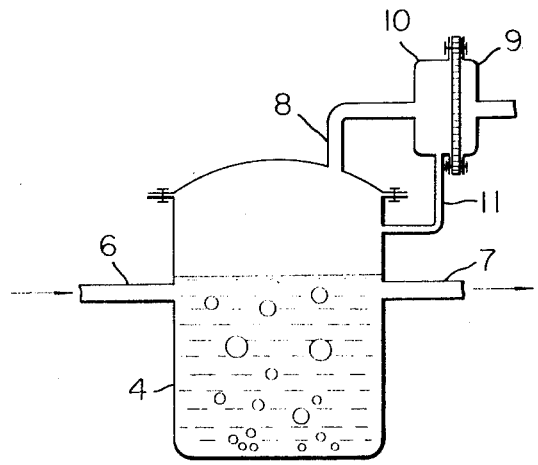

Both FIG. 1 and FIG. 2 attached show vertical section of the apparatuses useful for the sea water distillation in accordance with the subject method. In the drawings, the plurality of circles of varied sizes indicate air bubbles.

In FIG. 1, 4 is an evaporator, 5 is the cover of the evaporator 4, 6 is the inlet for sea water, 7 is the exit for sea water, 8 is the vapor outlet, and 9 is a paper filter of polytetrafluoroethylene. The said paper filter 9 covers the entire area of the mouth of the evaporator 4 and therefore the steam formed in the evaporator 4 must pass through the same. As the result of providing the polytetrafluoroethylene paper filter 9 covering the mouth portion of the evaporator 4 as in FIG. 1, the steam formed in the evaporator 4 passes completely through the paper filter and is led to the condenser from the steam outlet 8, but the water particles or spatterings entrained by the steam cannot pass the said paper filter 9 and their entrance into the condenser is almost completely prevented.

FIG. 2 shows an embodiment in which the liquid particle separator 10 is provided at the outside of the apparatus similar to that of FIG. 1, as shown. The liquid particles separated by the polytetrafluoroethylene paper filter 9 are left in the separator 10 and returned to the evaporator 4 through line 11. The liquid particles separator in the apparatus of FIG. 2 has a very simple structure and normally that of a small size sufficiently meets the purpose. Accordingly it is much more efficient when compared with catch-all employed by conventional techniques.

The apparatuses of FIG. 1 and FIG. 2 may also be used for separating a volatile acid in purified form from a mixture of volatile acid and non-volatile acid. When such an acid mixture is distilled, the volatile acid is gasified but at that time entrainment of non-volatile acid takes place. Accordingly the subject method can be applied against the spatterings similarly to the case of sea water spatterings. Polytetrafluoroethylene having a high resistance at high temperatures to many chemicals, it is apparent that the subject invention is applicable to many objects not limited to sea water and acid mixtures.

Now the invention will be explained with reference to the following working examples.

EXAMPLE 1

Sea water distillation was performed using the evaporation apparatus of FIG. 1.

In the apparatus of FIG. 1, the capacity of the evaporator was 10 liter, and the polytetrafluoroethylene paper employed had a thickness of about 2 mm., an average pore diameter of about 5μ and a porosity of about 62%.

The salt content of the water obtained using the apparatus was about 10 p.p.m., and so the product can be regarded as substantially pure water.

For control, sea water purification was similarly performed in the apparatus of FIG. 1 without the provision of the paper filter 9. Thus obtained water had a salt content of about 400 p.p.m. and was unsuitable for drinking.

The apparatus of FIG. 1 is very convenient for sea water purification in a place exposed to violent vibration such as the inside of small size ships, because even if the sea water level in the evaporator is oscillated, there is no fear of the sea water's passing through the paper filter 9 to flow into the condenser from the steam outlet 8.

EXAMPLE 2

Sea water distillation was performed using the apparatus of FIG. 2. The capacity of the evaporator was 10 liter and the polytetrafluoroethylene paper had a thickness of about 2 mm. an average pore diameter of about 12μ and a porosity of about 55%.

Thus distilled water had a salt content of about 10 p.p.m. and could be regarded as substantially pure water.

EXAMPLE 3

The same apparatus employed in Example 1 was filled with a waste acid mixture containing 10 wt. percent of hydrochloric acid and 10 wt. percent of sulfuric acid, and the liquid mixture was heated to 80° C. The polytetrafluoroethylene paper filter 9 allowed the passage of vaporized hydrochloric acid and steam only, but substantially completely prevented the passage of the liquid acid particles entrained. As the result, the distilled conc. hydrochloric acid contained only not more than 20 p.p.m. of sulfuric acid.

In the foregoing examples, when the polytetrafluoroethylene paper filter was replaced by filters made of other synthetic resins, no matter what form of filter was employed, sooner or later the absorption of the spatterings by the filters took place, resulting in swelling of the filters and clogging of the filter voids. Consequently passage of vapor therethrough became difficult. Comparing with such result, the performance of the polytetrafluoroethylene paper filter of the invention is indeed has a great merit.

It is of course within the scope of this invention to provide more than one continuous, porous sheet-formed matters of polytetrafluoroethylene at spaced positions. For example, the mouth of the evaporator of FIG. 2 may be covered with filter similarly to the case of FIG. 1, and whereby the prevention of entrainment will become still more perfect.

I claim:
1. A method for removing the fine liquid particles dispersed in a gaseous body which comprises passing a gaseous body containing fine particulate liquid as dispersed therein through at least one layer of continuous, porous sheet-formed substance made of polytetrafluoroethylene paper formed from fibrous powder of polytetrafluoroethylene having a fiber length of 100–5,000 microns, said sheet-formed substance having an average pore diameter of 2–50 microns and a porosity of 50–80%.

2. A method of obtaining substantially pure water by distillation of sea water which comprises passing a steam containing fine particles of sea water as dispersed therein through at least one layer of polytetrafluoroethylene paper formed from fibrous powder of polytetrafluoroethylene having a fiber length of 100–5,000 microns and having an average pore diameter of 2–50 microns and a porosity of 50–80%, and thereafter condensing the same.

References Cited

UNITED STATES PATENTS

| | | | |
|---|---|---|---|
| 3,129,146 | 4/1964 | Hassler | 203—10 X |
| 3,161,574 | 12/1964 | Elam | 203—86 X |
| 3,206,381 | 9/1965 | Neugebauer et al. | 203—86 X |
| 3,227,630 | 1/1966 | Beckman | 202—205 |
| 3,239,996 | 3/1966 | Huffman et al. | 55—16 |
| 3,246,450 | 4/1966 | Stern et al. | 55—16 |
| 3,274,750 | 9/1966 | Robb | 55—16 |
| 3,303,105 | 2/1967 | Konikoff et al. | 203—11 |
| 2,936,301 | 5/1960 | Thomas | 260—92.1 |
| 3,015,604 | 1/1962 | Hochberg | 162—157 |
| 3,371,468 | 3/1968 | Shropshire | 55—158 |
| 3,397,790 | 8/1968 | Newby et al. | 55—158 X |
| 3,405,058 | 10/1968 | Miller | 210—23 |
| 3,339,351 | 9/1967 | Carmichael et al. | 55—528 |

OTHER REFERENCES

Industrial and Engineering Chemistry, vol. 57, No. 2 (1965), pages 53, 54, 55 and 56, Stern et al. (authors).

NORMAN YUDKOFF, Primary Examiner

F. E. DRUMMOND, Assistant Examiner

U.S. Cl. X.R.

55—97, 528; 202—200